Nov. 17, 1925.

H. R. MYERS

RAIL JOINT CONNECTION

Filed April 16, 1925

1,562,182

Inventor

Harry R. Myers

By Nathan Levin

Attorney

Patented Nov. 17, 1925.

1,562,182

UNITED STATES PATENT OFFICE.

HARRY R. MYERS, OF NEW YORK, N. Y.

RAIL-JOINT CONNECTION.

Application filed April 16, 1925. Serial No. 23,591.

*To all whom it may concern:*

Be it known that I, HARRY R. MYERS, a citizen of the United States, residing in the city of New York, county of New York, State of New York, have invented a new and useful Improvement in Rail-Joint Connections, of which the following is a specification.

My invention relates to an improvement in rail joint connections, and the object thereof is to provide a device of the character described that is extremely simple in construction and which, with its force of tension, tightly clamps and secures the bolts and fish-plates to the rail joints, thus insuring a rigid and perfect section which prevents vibration and the loosening of bolts and fish-plates on the said rail connection.

Another object of this invention is to provide efficient and simple means of the class described which may be cast from tempered steel to insure a constant tension against the fish-plates connecting the rail joints to keep the bolts locked in a tight and secure position at all times so as to avoid accidents on railroads that are caused by loose connections of fish-plates and bolts. A further object is to provide a device of this character which will successfully hold the bolts and fish-plates in place and save a great deal of time in inspection and repair, and at the same time add additional safety in and about rail joint connections over which heavy locomotives and trains constantly run. My invention consists essentially, referring briefly and in general terms, to my improvement in a rail joint connection, of the very peculiar and novel combination, arrangement and construction of the various parts, as will be more fully described hereafter and set forth in the subjoined claims in accordance with the statutes in such cases made and provided therefor.

Referring to the accompanying drawings illustrating my invention and constituting a formal part of this application and wherein the same letters of reference are used to indicate or point out the same parts wherever occurring throughout the several views.

Figure 1:
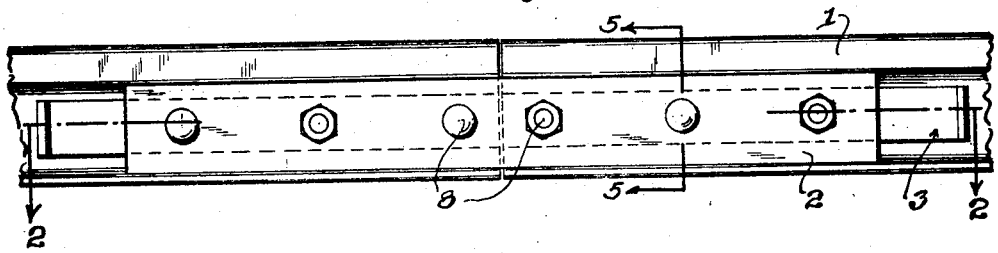
Figure 1 is a front view of the device.
Figure 2:
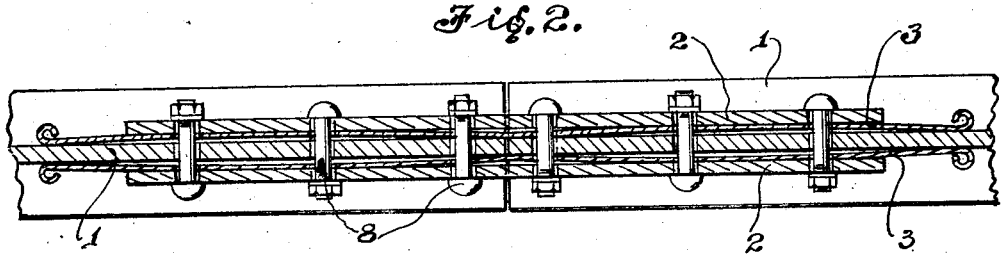
Figure 2 is a section on the line 2—2 of Fig. 1.
Figure 3:
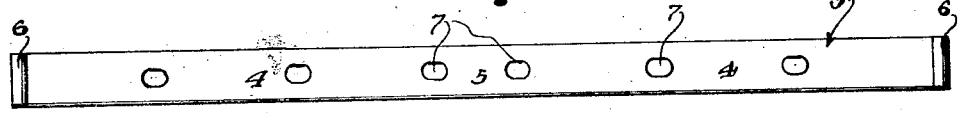
Figure 3 is a face view of the spring.
Figure 4:
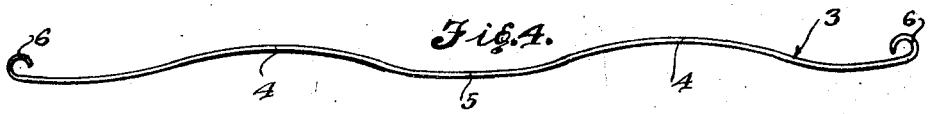
Figure 4 is a top view of the spring.

In the drawings forming a part of this application I have shown rails (1), connected by fish-plates (2), having in between the said rails and fish-plates on both sides thereof springs (3), the said springs comprising convex (4) and concave (5) portions, the ends of the springs being curled so as to permit of easy spreading of the spring while the same is being clamped by the fish-plates and bolts securing the same.

It will be noticed that the present invention consists of pliable springs (3) which, when clamped in place by the fish-plates (2) and bolts (8), tightly and rigidly lock the said bolts against the fish-plates on both sides thereof and insure a safe rail connection which becomes free from vibration, thereby supplying a means of additional safety in the use of rails by locomotives and trains.

The spring (3) contains convex (4) and concave (5) portions adapted to cause a tension which tightly grips the bolts against the fish-plates in a rigid position when the same are clamped in place upon the tightening of the bolts (8). It will also be noted that the said spring (3) contains oblong holes (7) to permit of the spreading of the spring when the same is being clamped by the fish-plates and bolts, and also to permit of expansion and contraction of the rail joint connections.

Figure 5:
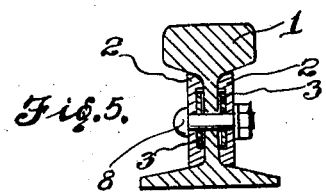
Figure 5 is a section on the line 5—5 of Fig. 1.

It will further be noted that the springs, which are preferably of the flat type, are placed between the fish-plates (2) and the rail (1) on both sides thereof to insure a strong spring-like tension which always keeps the plates and bolts in rigid position, thus preventing vibration and loosening of these members. The springs (3) fit into a slot or groove between the fish-plates and sides of rail (1), as will be noted by reference to Figure 5. The invention herein shown is adapted to be used on the standard fish-plate connections now used on railroads for rail joints and may be inserted in the rail joint connections at very little cost, without sacrificing any of the parts in use on railroads at the present time in connection with rail joints. It will, therefore, be seen from this description that a device is provided which rigidly and firmly locks bolts upon fish-plates used in connection with rail joints to insure safety in the use of rails for railroad locomotives and trains. Various changes in and modifications of the construction herein shown and described may be made without departing from the spirit of this invention or sacrificing its advantages. Not only may the said springs be used in connection with fish-plates and rail joints but also wherever bolts in a section are desired to be locked securely as a measure of safety.

Having fully described my invention, what I claim as new and desire to secure by Letters Patent is:

1. A rail joint comprising fish plates disposed on opposite sides of the rails, said fish plates having grooves on the inner sides thereof, springs disposed in said grooves between the rails and the said fish plates, and means for holding said fish plates in position.

2. A rail joint comprising fish plates disposed on opposite sides of the rails, said fish plates having grooves on the inner sides thereof, concavo-convex springs positioned in said grooves, and means for holding said fish plates in position.

3. A rail joint comprising the combination with rails adjacent to each other and in alignment of fish plates on opposite sides of the rails and overlapping the adjacent ends thereof, springs positioned between the rails and the fish plates and overlapping the adjacent ends of said rails, and means for holding said fish plates against the force of said springs.

4. A rail joint comprising fish plates disposed on opposite sides of the rails, said fish plates having grooves therein, springs disposed within said grooves, and means for holding said fish plates in position.

5. A rail joint comprising a fish plate having a groove therein, a spring disposed within said groove, and means for holding said fish plate in position.

6. A rail joint comprising fish plates disposed on opposite sides of the rails, concavo-convex springs disposed between the rails and the fish plates, and means for holding said fish plates in position against the force of the springs.

7. A rail joint comprising a fish plate, a concavo-convex spring disposed between the rails and the fish plate, and means for holding the fish plate in position against the force of the spring.

HARRY R. MYERS.